United States Patent [19]

Holland et al.

[11] Patent Number: 5,514,288
[45] Date of Patent: May 7, 1996

[54] METHOD OF PRETREATING FABRICS TO IMPART SOIL RELEASE PROPERTIES THERETO USING POLYMERS OF VINYL ETHERS

[75] Inventors: Richard J. Holland, Flanders, N.J.; Kathleen M. Guiney, Wyandotte, Mich.; Richard Baur, Mutterstadt; Matthias Kroner, Eisenberg, both of Germany

[73] Assignee: BASF Corporation, Mount Olive, N.J.

[21] Appl. No.: 174,598

[22] Filed: Dec. 28, 1993

[51] Int. Cl.$^6$ ................................................ D06M 15/19
[52] U.S. Cl. .................... 252/86; 252/8.9; 252/174.23; 252/DIG. 15; 8/137; 427/394
[58] Field of Search .............................. 252/8.6, 174.23, 252/DIG. 15, 8.9; 8/137; 427/394

[56] References Cited

U.S. PATENT DOCUMENTS

| | | | |
|---|---|---|---|
| 4,266,080 | 5/1981 | Falk et al. | 568/45 |
| 4,702,857 | 10/1987 | Gosselink | 252/174.21 |
| 4,746,456 | 5/1988 | Kud et al. | 252/174.24 |
| 4,846,994 | 7/1989 | Kud et al. | 252/174.21 |
| 4,846,995 | 7/1989 | Kud et al. | 252/174.21 |
| 4,849,126 | 7/1989 | Kud et al. | 252/174.23 |
| 4,999,869 | 3/1991 | Holland et al. | 8/115.62 |
| 5,012,011 | 4/1991 | Liu et al. | 568/610 |
| 5,106,705 | 4/1992 | Liu | 428/204 |
| 5,156,906 | 10/1992 | Holland | 428/264 |
| 5,158,811 | 10/1992 | Liu | 252/8.8 |

OTHER PUBLICATIONS

Bille et al., "Finishing for Durable Press and Soil Release", *Textile Chemist and Colorist*, vol. 1, No. 27, (1969). No Month.

*Primary Examiner*—Anthony Green
*Attorney, Agent, or Firm*—Joanne P. Will

[57] ABSTRACT

A method for the pretreatment of fabrics and textiles to impart soil release properties thereto involves contacting the fabrics with homopolymers or copolymers of vinyl ethers.

24 Claims, No Drawings

METHOD OF PRETREATING FABRICS TO IMPART SOIL RELEASE PROPERTIES THERETO USING POLYMERS OF VINYL ETHERS

FIELD OF THE INVENTION

The present invention relates to the use of certain homopolymers and copolymers of vinyl ethers in laundry pretreatments, and more specifically, to the use of such polymers as soil release agents in the pretreatment of fabrics to impart soil shield properties thereto.

BACKGROUND OF THE INVENTION

Fabrics woven from many synthetic fibers, and especially from polyester or blends comprising polyester and cotton fibers, are often very difficult to clean with conventional washing apparatus, e.g. washing machines. Polyester fibers are relatively easy to stain with oily (lipophilic) soils, but at the same time are difficult to wet in aqueous solution due to their hydrophobicity.

Textile manufacturers have addressed these problems by applying soil release finishes to these fabrics. These soil release finishes are most often hydrophilic in nature and can thus enhance the wetting of the fabrics by detergent solutions. This in turn helps to promote the rollup of oily soils during the wash cycle. The soil is removed from the fabric and transferred to the detergent. Thus, these surface coatings are known to impart soil release properties to fibers and fabrics so treated. The soil release finish can also act as a barrier between the surface of the fabric and the soil.

Soil release finishes can be applied to textiles in a variety of ways. In some cases, a non-permanent coating can be deposited in the rinse cycle of a conventional laundry process. In instances where a more permanent finish is required, the overlayer can be "heat set" to the fabric by drying at elevated temperatures often with mechanical pressure on the textile.

Often times, however, the surface coating and concomitant soil release capability is imparted to the fabric during a pretreatment process in which an aqueous bath is employed. The aqueous bath will often contain a pretreatment polymer with concentrations often ranging from 0.05–15% active. The pretreatment process basically comprises contacting the fabric surfaces with a dispersion of the polymer, drying the textile surface and then heat setting the finish using a device such as, for example, a hot clothes iron.

U.S. Pat. No. 4,999,869 describes soil release polymers made of polyalkylene oxide and vinyl esters which are used during the pretreatment process.

Likewise, U.S. Pat. No. 5,156,906 relates to the use of certain graft copolymers of polyethylene terephthalate/polyoxyethylene terephthalate with vinyl propionate and/or vinyl acetate as soil release agents for man-made fabrics, e.g. polyester blends.

Distinct from the concept of "soil release" is what is referred to as "anti-soil redeposition". The latter is a process which prevents the redeposition of soil which has already dissolved or dispersed in the wash water. It is obvious that the functions of the detergents and the surface finishing chemicals must complement each other in the anti-redeposition process. But although the anti-redeposition process is often confused with soil release, it is not the same thing. In fact, there is very little direct connection between the two. In this regard, see Bille et al., "Finishing for Durable Press and Soil Release", *Textile Chemist and Colorist*, vol. 1, No. 27 (1969).

Numerous polymers have been described as anti-redeposition agents. U.S. Pat. No. 4,746,456 describes anti-redeposition agents made of polyalkylene oxides and vinyl acetate. U.S. Pat. Nos. 4,846,994 and 4,846,995 are directed to soil anti-redeposition with polyalkylene oxide and vinyl esters.

U.S. Pat. No. 4,849,126 relates to soil anti-redeposition agents with polycondensates based on polyesters, polyester urethanes and polyester amides grafted with certain vinyl esters. For example, polyesters of terephthalic acid may be grafted with vinyl acetate. While disclosing the after-treatment of a fabric surface to impart anti-redeposition properties utilizing the graft polymers set forth therein, the '126 patent makes no reference of employing these polymers for the pretreatment of the fabric to impart soil release properties thereto.

There presently exists a need in the art for a method of pretreating fabric and textile surfaces with certain polymers of vinyl ethers so that important soil release properties may be imparted thereto. There also exists a need for textile material and fabrics, e.g. cotton and cotton/polyester blends, so treated.

Further, as ecological standards become more stringent, there is also a need for soil release polymers, which unlike some found in the literature today, are highly stable for extended periods of time in alkaline environments. These soil release compounds should not break down even in highly alkaline waters approaching a pH of about 14. But when these polymers are exposed to an environment that is slightly acidic, as can occur in surface water containing dissolved carbon dioxide, there is also the requirement that they be able to chemically degrade to their monomeric components. This feature will facilitate their overall biodegradation.

OBJECTS OF THE INVENTION

It is therefore an object of the present invention to provide a method of pretreating fabrics and textiles with homopolymers and copolymers of vinyl ethers so as to impart soil release properties thereto.

It is a further object of the present invention to utilize homo- and copolymers of hydroxybutyl vinyl ethers and hydroxyhexyl vinyl ethers in the pretreatment of fabric surfaces.

It is another object of the invention to provide for the use of the above polymers to pretreat fabrics made of polyester and blends of polyester and cotton, as well as other synthetic fabrics such as polyamides.

A further object is to provide soil release compounds which are environmentally sound.

Another object is to provide fabrics, including man-made blends, treated according to the method of the invention.

SUMMARY OF THE INVENTION

These and other objects of the invention are achieved by providing a method for the pretreatment of fabrics and textiles to impart soil release properties thereto, which involves contacting the fabrics with homopolymers or copolymers of vinyl ethers.

Also provided as part of the invention are fabrics and textiles which have been treated according to the various methods of the embodiments of the invention.

DETAILED DESCRIPTION OF THE PREFERRED EMBODIMENTS

As that term is used herein, the term "soil release properties" or "soil shield properties" refers to the ability of an additive, e.g. a polymer, to impart hydrophilic character to the surface of a fabric which allows the soil to penetrate to a certain extent and which develops its activity during laundering, when its special functional groups remove soil from the fabric and transfer it to the detergents.

The broad range of vinyl ether homopolymers and copolymers suitable for use as soil release agents in the various embodiments of the invention may be prepared by cationic or free radical copolymerization of the monomers from the group of:

(a) from about 99 to about 1% by weight of vinyl ethers, more preferably about 90 to about 10% by weight;

(b) from about 1 to about 99% by weight of the adducts of $C_2$–$C_4$ alkylene oxides with vinyl ethers and/or polytetrahydrofuran vinyl ethers, more preferably about 10% to about 90% by weight; and (c) from about 0 to about 98% by weight of other monomers which may be copolymerizable with the monomers of (a) and (b).

Suitable monomers of group (a) are all vinyl ethers or related structures which are derived from compounds which have about 2 or more —OH groups and in which the hydrogen atom of one —OH is replaced by the vinyl group. These compounds can be characterized, for example, with the aid of the following formula:

$$CH_2=CH-O-R-OH$$

wherein R is a divalent or polyvalent radical which may furthermore be substituted, for example R may be a $C_2$–$C_{20}$-alkylene, phenylene or a $C_2$–$C_{20}$-alkylene or phenylene group substituted by —OH groups, by ester groups, by ether groups, by polyether groups or by diol groups.

The preferred monomers of group (a) are the following: the hydroxybutylvinyl ethers and the hydroxyhexylvinyl ethers, as well as ethyleneglycolmonovinylether, diethyleneglycolmonovinylether, triethyleneglycolmonovinylether, tetraethyleneglycolmonovinylether, polyethyleneglycolmonovinylether (M. W. up to about 10,000), 1,4-butanediolmonovinylether, 1,6-hexandiolmonovinylether, 1,2-propyleneglycolmonovinylether, dipropyleneglycolmonovinylether,tripropyleneglycolmonovinylether, polypropyleneglycolmonovinylether (M.W. up to about 10,000), 1,2-butyleneglycolmonovinylether, and the trans and cis cyclohexan-1,4-dimethanol-monovinylether.

Of these, the hydroxybutyl and hydroxyhexyl vinyl ethers are especially preferred. The 1-,2-,3- and 4-hydroxybutylvinyl ethers, the 1-,2-,3-,4-,5- and 6-hydroxyhexylvinylethers, as well as mixtures thereof comprise this especially preferred group. Most preferred are 4-hydroxybutylvinylether and 6-hydroxyhexylvinyl ether.

Suitable monomers of group (b) are the adducts of $C_2$–$C_4$-alkylene oxides with the vinyl ethers which are set forth above as the monomers of component (a). Preferred alkylene oxides may include, for example, ethylene oxide, propylene oxide, 1,2-butylene oxide, 2,3-butylene oxide and isobutylene oxide. Especially desirable is ethylene oxide.

These alkylene oxides may be subjected to an addition reaction of the type known in the art with the vinyl ethers to yield the monomers of components (b). The preferred vinyl ether components of monomer (b) are the hydroxybutyl and hydroxyhexyl vinyl ethers. These would include the 1-, 2-, 3- and 4-hydroxybutylvinyl ethers, the 1-, 2-, 3-, 4-, 5- and 6-hydroxyhexyl vinyl ethers, and mixtures thereof. Of these, the hydroxyhexyl vinyl ethers are especially preferred, with the 6-hydroxyhexylvinyl ether being more preferred.

The molar ratio of the heretofore described adducts of alkylene oxides to vinyl ethers of component (b) are preferably within the range of from about 1 to 100 moles of alkylene oxide for each 1 mole of vinyl ether, more preferably about 1 to 30 moles per 1 mole of vinyl ether, and even more preferably about 1 to 25 moles for each 1 mole of vinyl ether. It is especially desirable that the monomers of component (b) are the adducts of from about 3 to 10 moles of alkylene oxide with about 1 mole of ether.

Vinyl ether compounds comprising copolymers of (a) and (b) are especially preferred in the method of the invention. The weight ratio of monomer (a) to monomer (b) in the vinyl ether copolymer is preferably within the range of from about 10:1 to about 1:10. It is even more preferred that the ratio of monomers in the copolymer be within the range of from about 9:1 to 1:9. In percentage terms, this means that for every 90% of monomer (a), there will be about 10% of monomer (b). At the opposite end, for every 10% of monomer (a) there will be 90% of monomer (b). Even more desirably, the weight ratio of monomer (a) to monomer (b) should be within the range of about 9:1 to about 7:3.

Preferred examples of component (c) may include from about 0 to about 98% by weight of the copolymerizable monomers from the group of divinyl ethers, compounds having about 2 or more —OH groups, and mixtures thereof.

The monomers (a), (b) and, if desired, (c) may be copolymerized, by both free radical and cationic copolymerization. In the free radical copolymerization, C—C bonding takes place via the double bonds of the monomers with the formation of polymers.

All free radical donors known for this purpose can be used as initiators. These initiators may be water-soluble or water-insoluble. Water-soluble initiators are, for example, inorganic peroxides, such as potassium, sodium and ammonium peroxodisulfate and hydrogen peroxide. Other suitable initiators are inorganic peroxides, hydroperoxides, peracids, ketone peroxides, perketals and peresters, for example methyl ethyl ketone hydroperoxide, cumene hydroperoxide, tert-butyl hydroperoxide, 1,1-(di-tert-butylperoxy)-cyclohexane, di-(tert-butyl) peroxide, tert-butyl peroxypivalate, ethylhexyl peroctanoate, tert-butyl monoperoxymaleate, dicyclohexyl peroxydicarbonate, dibenzoyl peroxide, diacetyl peroxide and didecanoyl peroxide, and mixtures of peroxides. Redox systems which contain a reducing component in addition to a peroxy compound are also suitable. Useful reducing components are, for example, cerium (III) and iron (II) salts, sodium sulfide, sodium bisulfite, sodium dithionite, ascorbic acid and sodium formaldehyde sulfoxylate. Suitable initiators are preferably chosen so that the free radical-forming compounds used are those which have a half life of less than 3 hours at the particular polymerization temperature chosen. If the polymerization is first started at a low temperature and is completed at a higher temperature, it is advantageous to use two or more initiators which decompose at different temperatures, ie, first an initiator which decomposes at a lower temperature for starting the polymerization and then an initiator which decomposes at a higher temperature in order to complete the main polymerization. By adding heavy metal salts, for example copper, cobalt, manganese, iron, nickel and chromium salts, to peroxide catalysts, the decomposition temperature of the peroxide catalysts can be reduced.

Other suitable initiators are azo compounds, such as 2,2'-azobisisobutyronitrile, 2,2'-azobis-(2-amidino-propane) dihydrochloride, 2,2'-azobis-(2-methylpropionamidine) dihydrochloride, 2,2'-azobis-(2,4-dimethylvaleronitrile) and dimethyl 2,2'-azobisisobutyrate. Hydrogen peroxide, potassium, sodium and ammonium peroxodisulfate, tert-butyl perpivalate, 2,2'-azobis-(2,4-dimethylvaleronitrile) and di-tert-butyl peroxide are particularly preferably used as initiators in the polymerization. From 0.5 to 10, preferably from 1 to 8, % by weight, based on the monomers to be polymerized, of a free radical initiator or of a mixture of such polymerization initiators are usually used. The amount of initiator used is known to have a considerable effect on the molecular weight of the resulting homo- and copolymers.

The free radical polymerization is preferably carried out in the presence of a diluent. These may be solvents for the monomers and the polymers or merely solvents for the monomers. Examples of suitable solvents are ethers, such as diethyl ether, dibutyl ether, diisobutyl ether, methyl tert-butyl ether, cyclic ethers, e.g. tetrahydrofuran and dioxane, mono- or dialkyl ethers of mono- or polyethylene glycols, e.g. ethylene glycol dimethyl ether, ethylene glycol dibutyl ether, diethylene glycol dimethyl ether, diethylene glycol dibutyl ether, monoalkyl ethers of mono- or polyethylene glycol acetates, ethers of mono- or polyethylene glycol acetates, such as methylglycol acetate, butylglycol acetate, methyldiethylene glycol acetate and butyldiethylene, and butyldiethylene glycol acetate, and adducts of alkylene oxides of 2 to 4 carbon atoms with $C_1$–$C_2$-alcohols or alkylphenols. The molecular weights of these adducts may be up to 8,000, preferably up to 6,000. If 2 or more different alkylene oxides are used for the preparation of the adducts, the alkylene oxide units in the reaction products may be randomly distributed or may be present in the form of blocks.

Preferred solvents for the polymerization are, for example, reaction products of monohydric aliphatic $C_1$–$C_{28}$-alcohols or $C_1$–$C_{18}$-alkylphenols with ethylene oxide, propylene oxide and/or butylene oxide, for example the adducts of from 3 to 11 mol of ethylene oxide with 1 mol of a $C_{13}$/$C_{15}$-alcohols, adducts of from 5 to 15 mol of ethylene oxide with 1 mol of nonylphenol, adducts of from 7 to 11 mol of ethylene oxide and from 3 to 5 mol of propylene oxide with 1 mol of oleyl alcohol and adducts of from 5 to 15 mol of ethylene oxide with 1 mol of stearyl alcohol or tallow fatty alcohol. Other suitable adducts are those of ethylene oxide, propylene oxide and butylene oxide with polyhydric alcohols e.g. glycol, diethylene glycol, triethylene glycol, tetraethylene glycol, propylene glycol, dipropylene glycol, block copolymers of ethylene oxide and propylene oxide, glycerol and oligoglyxerols. Diethylene glycol and polyethylene glycols having degrees of condensation of up to 25 are particularly preferred from this group of compounds.

Other suitable solvents are $C_1$–$C_6$-alcohols, such as methanol, ethanol, isopropanol, n-propanol, butanols, n-hexanol and cyclohexanol, ketones, e.g. acetone, ethyl methyl ketone and cyclohexanone, esters e.g. ethyl acetate, and water and mixtures of water with water-soluble organic solvents. If an inert solvent is used in the polymerization, the concentration of the monomers therein are from 10 to 90, preferably from 15 to 70, % by weight.

The polymerization of the monomers of groups a) to c) can, if required, additionally be carried out in the presence of regulators. Examples of suitable regulators are mercapto compounds, such as mercaptoethanol, mercaptopropanol, mercaptobutanol, mercaptoacetic acid, mercaptopropionic acid, butyl mercaptan and dodecyl mercaptan. Other suitable regulators are allyl compounds, such as allyl alcohol, aldehydes, such as formaldehyde, acetaldehyde, propionaldehyde, n-butyraldehyde and isobutyraldehyde, formic acid, ammonium formate, propionic acid, hydroxylammonium sulfate and butenols. Regulators are used in particular when relatively large amounts of crosslinking monomers of group c) are used in the polymerization. Because of the use of the regulators, water-soluble polymers or polymers which are readily dispersible in water are obtained in such cases.

The copolymerization can also be carried out in the absence of diluents. This procedure is very particularly suitable when hydroxyalkyl vinyl ethers having a higher degree of ethoxylation are used as monomers of component (b), for example in the case of reaction products of 4-hydroxybutyl vinyl ether with 3, 7, 11, 25 or 50 mol of ethylene oxide per mol of 4-hydroxybutyl vinyl ether and dimethyl maleate or diethyl maleate as monomers of component (c).

The progress of the copolymerization can be readily monitored on the basis of the decrease in the vinyl ether content of the reaction mixture, with the aid of iodine titration. After the polymerization, residual vinyl ether terminal groups can be cleaved by treating the polymers in an aqueous acidic medium. The resulting acetaldehyde can readily be removed from the aqueous polymer solution with the aid of a steam distillation. Copolymers which are virtually free of residual monomers can be prepared in this matter.

The copolymers can be further modified after the polymerization. For example, copolymers which contain the monomers (a) and (b) and, as monomer (c), an ester of an ethylenically unsaturated carboxylic acid in the form of polymerized units can be converted into a carboxylate-containing copolymer by treatment with an aqueous base, for example sodium hydroxide solution, with ester hydrolysis. Another possibility is to allow hydroxylamine, ammonia or an amine to act on novel copolymers containing polymerized ester groups so that hydroxamic acids or carboxamides are obtained. Here, a large number of secondary reactions for modifying the novel copolymers are possible.

The monomers (a), (b) and, if desired, (c) may also be subjected to cationic polymerization. Here, the OH group of one monomer undergoes an addition reaction with the vinyl ether group of the neighboring molecule with the formation of an acetaldehyde acetal. This polymerization results in a polymeric main chain in which the monomer units are bonded to one another by acetaldehyde acetals. The cationic copolymerization of the monomers of groups (a) and (b) can be initiated with the aid of all organic or inorganic acidic substances. Examples of suitable cationic initiators are oxalic acid, tartaric acid, adipic acid, succinic acid, succinic anhydride, citric acid, formic acid, acetic acid, propionic acid, malic acid, mono- or polyhalogenated carboxylic acids, such as trifluoroacetic acid or trichloroacetic acid, hydrogen chloride, hydrogen bromide, hydrogen iodide, sulfuric acid, phosphoric acid, benzenesulfonic acid, p-toluenesulfonic acid, boric acid, ascorbic acid, acidic alumina, aluminum sulfate, potassium aluminum sulfate, iron (II) sulfate, iron (III) sulfate, alumina, titanyl sulfate, iron(III) chloride, boron trifluoride, boron trichloride, boron tribromide, iodine, ion exchangers in the acidic form and acid-laden inert solid substances. The initiators for the cationic polymerization are usually used in amounts of from 0.001 to 20, preferably from 0.01 to 1, % by weight, based on the monomers of groups (a) and (b). The copolymerization is highly exothermic. The reaction temperatures are from −20° to 250° C., preferably from 0° to 200° C., depending on the activity of the initiator used.

For example, in the presence of from 0.1 to 5% by weight of p-toluenesulfonic acid, the monomers (a) and (b) react completely in an exothermic reaction at as low as 40° C. in the course of 10 minutes. If 0.2% by weight of oxalic acid is used for initiating the copolymerization, the copolymerization is complete in the course of 1 hour at 90° C. and in the course of only 10 minutes at 130° C. However, it is also possible to carry out the copolymerization initiated by oxalic acid in the course of a few seconds at 200° C. In the case of initiation by means of relatively weak acids (tartaric acid, oxalic acid or citric acid), temperatures above 70° C. are generally chosen, whereas when strong acids, such as toluenesulfonic acid, are used, the reaction temperatures are kept below 70° C. The copolymerization generally gives colorless oils or resins which have very high heat stability when oxalic acid and tartaric acid are used as catalysts. The copolymers thus prepared are stable to 250° C.

The cationic polymerization of the monomers (a) and (b) is preferably carried out in the absence of a solvent. However, it is also possible for inert diluents to be present. This may be advantageous in certain cases because the heat of reaction can then be readily removed with the aid of the evaporating diluent. When a strong acid is used as an initiator, a solution of the initiator in a diluent is preferably employed, for example a 0.005–10, particularly preferably 0.01–5, % strength by weight solution of p-toluenesulfonic acid in toluene.

Suitable diluents for the cationic copolymerization are all diluents which carry no functional groups capable of reacting with vinyl ethers. Preferably used diluents are those which are readily obtainable in anhydrous form and are not hygroscopic. Examples of suitable diluents are ethyl acetate, diethylene glycol diethyl ether, ethoxyethyl acetate, butoxyethyl acetate, aliphatic hydrocarbons, such as pentane, hexane, cyclohexane, n-heptane, n-octane and isooctane, and aromatic hydrocarbons, such as toluene, xylene, mesitylene, tetralin and anisole. Other suitable solvents are tetrahydrofuran, dioxane and decalin, acetone, methyl ethyl ketone and cyclohexanone.

The copolymerization can be carried out, for example, as a single-vessel reaction. For this purpose, monomers of groups (a) and (b) and, if desired, (c) may be mixed in a reaction vessel in the absence of atmospheric humidity, the initiator can be added and the mixture can be heated to the required reaction temperature. In a preferred embodiment, the total amount of initiator is initially taken in the reaction vessel at 20° C., together with 10% of the monomer mixture to be polymerized, comprising components (a), (b) and, if required, (c) and the polymerization reaction is started, preferably under an inert gas atmosphere, by heating the components initially taken in the reaction vessel. The mixture is stirred during this procedure and also during the subsequent copolymerization. As soon as the polymerization has started, the remaining monomer mixture of the compounds of components (a), (b) and (c) is added continuously or batchwise to the initially taken mixture at a rate such that the heat of polymerization can be reliably removed. If oxalic acid, tartaric acid or citric acid is used as the initiator, temperatures of from about 70° to about 160° C. are required for starting the copolymerization of the monomers (a), (b) and, if required, (c). The acids then dissolve in the monomer mixture to give a homogeneous solution, and the polymerization begins.

In the case of initiators which do not dissolve in the monomer mixture, the heterogeneous reaction mixture is heated to a temperature in the range of from 100° to 250° C. until the polymerization starts.

After the copolymerization, the initiator is either separated off or deactivated. Deactivation of the catalyst is advisable because, in the presence of acidic substances and water or of other protic solvents, the copolymers undergo hydrolysis with a reduction in the molecular weight. To deactivate the initiator, an alkali, preferably sodium bicarbonate, sodium hydroxide solution, potassium hydroxide solution, sodium carbonate, potassium carbonate, ammonium carbonate, an amine, such as ammonia, methylamine, dimethylamine, trimethylamine, ethylamine, diethylamine, dibutylamine, tributylamine, ethanolamine, diethanolamine, triethanolamine or morpholine, or a salt of a strong base and a weak acid, such as sodium acetate, sodium formate or potassium bicarbonate, is added to the reaction mixture after the end of the copolymerization and if necessary after cooling of the reaction mixture. Calcium oxide, calcium hydroxide, basic alumina and basic ion exchangers are also suitable for deactivating the acidic initiators. Insoluble initiators can readily be removed by filtering them off.

After deactivation or separation of the initiator, the copolymer can be converted into a polymer solution or a dispersion by adding water. The copolymer solutions can be purified by subjecting them to steam distillation, and volatile components can be distilled off. During the steam distillation, the pH of the aqueous medium should be above 7. Copolymers which have been subjected to steam distillation do not become discolored if they are subjected to an alkali aftertreatment.

The copolymers may contain from about 99 to 1, preferably from about 90 to 10, % by weight of one or more monomers of group (a) and from about 1 to 99, preferably from about 10 to 90, % by weight of one or more monomers of group (b) as polymerized units. The monomers are preferably chosen so that water-soluble or waterdispersible copolymers are formed. By varying the mixing ratios of monomers of group (b) and monomers of group (a), the solubility of the resulting copolymers in water can be influenced. Depending on the ratio of the polymerized monomers of groups, (a) and (b), the copolymers in the form of 1% strength by weight aqueous solutions at a pH of 7.5 have turbidity points of from 0° to 100° C., preferably from 5° to 85° C. By increasing the molecular weight, the turbidity point of the copolymers can be reduced while the ratio of monomers of groups (a) and (b) is kept constant. The molecular weight of the copolymers can be influenced by the amount of initiator. An increasing amount of initiator leads to copolymers having a low molecular weight. Furthermore, the molecular weight of the copolymers can be influenced by the presence of copolymerizable monomers of group (c). As stated above, divinyl ethers and compounds containing two or more OH groups are suitable comonomers (c) which increase the molecular weight of the copolymers in the cationic copolymerization of (a) and (b).

If, in the preparation of the monomers (b) by alkoxylation of the monomers of group (a), polyalkylene glycols which cannot be readily separated off are present as impurities, these mixtures of alkoxylated vinyl ethers and polyalkylene glycols can be used in the copolymerization. Being diols, polyalkylene glycols limit the molecular weight in the polymerization of monomers of groups (a) and (b). In this case, an equimolar amount, based on the OH groups, of vinyl ether groups is added in the form of divinyl ethers, so that copolymers having higher molecular weights are obtained. If the divinyl ethers are used in a superstoichiometric amount relative to the polyalkylene glycols, they limit the molecular weight. Where they are present in the copolymerization, the divinyl ethers are used in amounts of not more than about 10% by weight.

It is especially desirable that the copolymer for use as a soil release agent according to the various embodiments of the invention be one or more compounds from the group of hydroxybutyl vinyl ether monomers described as component (a) copolymerized with the ethylene oxide adduct of either the hydroxybutyl or hydroxyhexyl vinyl ether monomers which comprise component (b). In at least one embodiment, it is preferred that there be about a 9 to 1 weight ratio of component (a) to component (b). In other embodiments, about a 7 to 3 weight ratio will be preferred.

In the various more preferred embodiments, the molar ratio of ethylene oxide to either the hydroxybutyl or hydroxyhexyl vinyl ethers of component (b) will preferably be within the range of about 1 to 25 moles of ethylene oxide for each 1 mole of vinyl ether.

An especially preferred copolymer for use with the method(s) of the invention is therefore about 90% by weight of hydroxybutyl vinyl ether as monomer (a) copolymerized with about 10% of the ethylene oxide adduct of hydroxyhexyl vinyl ether as monomer (b). In this copolymer, there will be about 3 moles of ethylene oxide for each 1 mole of hydroxyhexyl vinyl ether in component (b). The copolymer may be abbreviated as HBVE +3EO/HHVE.

Another especially preferred compound will have about 70% hydroxybutyl vinyl ether as monomer (a) copolymerized with about 30% of the ethylene oxide adduct of hydroxyhexyl vinyl ether as monomer (b). The latter component will find about 25 moles of ethylene oxide for each one mole of hydroxyhexyl vinyl ether. The total polymerized compound may be set forth as HBVE+25EO/HHVE.

A third desirable compound will be made up of about 70% of hydroxybutyl vinyl ether as monomer (a) copolymerized with about 30% of the ethylene oxide adduct of hydroxybutyl vinyl ether as monomer (b). There will be about 3 moles of ethylene oxide for each one mole of hydroxybutyl vinyl ether in the component monomer (b). This compound can therefore be abbreviated as HBVE+3EO/HBVE.

A fourth preferred copolymer will be comprised of about 70% of the monomer hydroxybutytvinyl ether copolymerized with about 30% of the ethylene oxide adduct of hydroxyhexyl vinyl ether. The EO adduct will contain about 7 moles of ethylene oxide for each one mole of hydroxyhexyl vinyl ether in component (b). This copolymer will be set forth as HBVE+7EO/HHVE.

Once polymerization of the hydroxyalkyl vinyl ethers according to their various embodiments is complete, a dispersion of the copolymer so obtained is prepared. To obtain the dispersion, from about 0.5 to about 15%, and preferably from about 0.5 to 5%, and even more desirably about 2% of the active copolymer is utilized. The active is dispersed in a suitable solvent or dispersing agent known in the art. Preferably, the agent is a combination of about 95% ethanol and 5% water by weight. Other alcohols, for example methanol, propanol and isopropanol, as well as mixtures thereof, may also be used to disperse the copolymer.

The textile or fabric to be treated according to the method of the invention is first brought into contact with the dispersion of the copolymer. Those skilled in the art may find numerous ways of doing this. It is preferred, however, that contact be effected primarily by immersing and soaking the textile in the dispersion. The fabric is soaked in the dispersion for a period of about 0.5 to 60 minutes, and preferably for about 10 minutes. After soaking is completed, the fabric is then dried using, for example, a heat gun. The fabric may then be heat set using a clothes iron. Also preferred is a prewashing treatment in which the fabric to be treated, together with the soil release agent formulation and a standard laundry detergent, are washed together in a normal wash and rinse cycle in a commercially available washing machine, and then dried in a standard dryer.

The fabrics pretreated according to the method of the invention include polyester, as well as blends of polyester and cotton, and other synthetic fibers such as polyamides. It is also within the scope of the invention to pretreat other known fabrics to impart soil release properties thereto. The aforementioned pretreated fabrics may then be utilized in apparel/clothing and textile manufacturing to produce a wide array of finished and semifinished goods where the benefits of pretreatment are desired. Such products may include for example shirts, blouses, pants, skirts, dresses, linens, towels, as well as the wholesale material which is utilized to produce these goods.

The preferred copolymers of the invention are highly stable in alkaline environments at approximately a pH of 14, and thus may be stored for relatively long periods under these conditions. These same copolymers, however, have been shown to be rather unstable in aqueous solutions at pH's below about 7. Under these conditions, hydrolytic cleavage of the copolymers occurs. For example, the preferred copolymers which are made up of the monomers of group (a) and (b), heretofore described, are hydrolyzed in aqueous solution in the course of from 10 to 20 days at a pH of about 6.2, in the course of from 1 to 10 days at a pH of about 5.3, in the course of from 1 to 30 hours at a pH of about 4.7, and in the course of from 1 to 90 minutes at a pH of about 2.5.

The significance of the foregoing is that the copolymers of the invention will also break down into their monomeric components in streams, lakes and rivers as part of effluent under slightly acidic conditions (pH less than about 7). This feature therefore enhances the ecological desirability of the copolymers used as part of the invention.

The following examples are provided to illustrate various aspects of the invention, but in no way should be construed as limiting the scope thereof:

PERFORMANCE EVALUATIONS: USE OF HYDROXYALKYLVINYLETHER POLYMERS

EXAMPLE 1

TABLE 1

| HBVE/HBVE (EO) AND HBVE/HHVE (EO) POLYMERS | | |
| --- | --- | --- |
| POLYMER ID | MONOMERS | RATIO OF MONOMERS |
| A | HBVE + HHVE (3 EO) | 9:1 |
| B | HBVE + HHVE (25 EO) | 7:3 |
| C | HBVE + HBVE (3 EO) | 7:3 |
| D | HBVE + HHVE (7 EO) | 7:3 |

Polymers within the scope of the invention (TABLE 1, above) were used as part of an industrial laundry detergent to impart soil release (soil shield) properties to polyester and polyester/cotton fabrics that were stained with an extremely tenacious oily stain, dirty motor oil. The high caustic industrial detergent in TABLE 2, below, was used at a concentration of 8 grams per liter of wash liquor.

TABLE 2

INDUSTRIAL LAUNDRY DETERGENT (8 grams/liter)

| COMPONENT | PERCENT ACTIVE BY WEIGHT |
| --- | --- |
| SODIUM HYDROXIDE | 37.5 |
| PLURAFAC ® B-25-5 SURFACTANT | 5.0 |
| SODIUM METASILICATE | 0.6 |
| SOKALAN ® PA-30 POLYMER | 0.6 |
| HAVE POLYMER | 0 or 1.25 |
| WATER | BALANCE TO 100 |

Registered trademarks of BASF.

The dirty motor oil soil release measurements were carried out using a Terg-o-Tometer according to a three step procedure. Clean fabrics (three DACRON® Single Knit, DSK, Style 730 swatches from Testfabrics of Middlesex, N.J. were used for each of Polymers A, B, C, and D and a Control for a total of 15 swatches) were prewashed in the formulation in TABLE 2, using a twelve minute wash cycle (150° F.) followed by a two minute rinse cycle (100° F.) with a water hardness level of 150 ppm ($Ca^{++}/Mg^{++}$: 2/1). After prewashing, the swatches were placed in separate laundry bags and dried for forty five minutes in a clothes dryer (high setting).

After drying, the fabrics were placed on aluminum foil and stained with dirty motor oil (DMO) obtained from the crankcase of a 1976 Toyota automobile. Each DSK swatch was stained with four drops of DMO in two spots (two drops per spot). The stained swatches were allowed to wick for at least sixteen hours.

The stained swatches were washed under the same conditions used in the prewash: 150° F., 12 minute wash; 100° F., 2 minute rinse, both with 150 ppm water hardness. Fabrics were dried for forty five minutes (high setting).

To measure percent soil release, the average starting reflectance of the virgin cloth ($Rd_1$) was measured. The average reflectance of the stained cloth ($Rd_2$) was read after the sixteen hour wicking period. After the final wash and drying cycle, the average reflectance of the cleaned cloth ($Rd_3$) was determined. Percent soil release (% SR) was calculated using the following equation:

$$\% SR = \frac{(Rd_3 - Rd_2) \times 100}{(Rd_1 - Rd_2)}$$

Confidence intervals (95% level) were calculated for each formula evaluated.

Results of the DMO soil release experiments at 2% active are shown below in TABLE 3.

TABLE 3

DMO SOIL RELEASE; INDUSTRIAL DETERGENT (TABLE 2) PREWASH/WASH 150° F. (12 min.); RINSE 100° F. (2 min.); 150 ppm

| HAVE POLYMER | PERCENT SOIL RELEASE DACRON ® SINGLE KNIT |
| --- | --- |
| POLYMER A | 95.4 (0.6) |
| POLYMER B | 95.3 (0.8) |
| POLYMER C | 91.8 (1.5) |
| POLYMER D | 92.9 (0.5) |
| NO POLYMER | 52.9 (6.1) |

95% CONFIDENCE INTERVALS ARE IN PARENTHESIS.

An examination of the data in TABLE 3 shows that the extremely alkaline caustic detergent without polymer provides about 50% DMO stain removal. Despite the high alkalinity of the formula and the high temperature of the wash, one is unable to improve stain removal much beyond this level. However, if the HAVE polymers of the invention are added to the caustic formulation close to 100% soil release performance is achieved on DACRON® Single Knit fabrics after only one prewash. This shows that the polymers not only survive the high alkaline, high temperature environment, but deliver their performance advantages under the extremely aggressive washing conditions used in industrial laundry.

EXAMPLE 2

To further demonstrate the efficacy of the method of pretreating fabrics according to the invention, the following additional tests were conducted on DACRON® double knit polyester and 50/50 polyester/cotton blend, as well as on polyester single knit fabrics.

The soil shield properties of the copolymer structures based on HBVE/HBVE(EO) or HBVE/HHVE(EO), and identified in TABLE 1, were evaluated under U.S. household conditions. In these assessments the mixed active liquid laundry detergent shown in TABLE 4 was employed.

TABLE 4

HOUSEHOLD LIQUID LAUNDRY DETERGENT USE LEVEL = 2 grams/liter

| COMPONENT | PERCENT ACTIVE BY WEIGHT |
| --- | --- |
| SODIUM ALKYLBENZENE SULFONATE | 16.0 |
| ALKOXYLATED ALCOHOL (AS SPECIFIED) | 7.0 |
| SODIUM XYLENE SULFONATE | 2.0 |
| TRIETHANOLAMINE | 2.0 |
| POLYMER | 0 or 2.0 |
| SODIUM CITRATE | 0 or 10.0 |
| WATER | BALANCE TO 100 |

The red dyed motor oil (RDMO) soil shield procedure is similar to that disclosed by Gosselink et al., U.S. Pat. No. 4,702,857, and assigned to the Procter & Gamble Company. Briefly, three clean DACRON® single knit (DSK, S-730 from Testfabrics, three swatches each for Polymers A, B, C, D, and Control) or three clean DACRON® double knit (DDK, S-720, Testfabrics) and three clean D(50)/C(50) blend swatches are prewashed in a Terg-o-Tometer under cold (80° F.), warm (95° F.) or hot (120° F.) water washing conditions, as specified, for 12 minutes, followed by a 2 minute rinse (both cycles with 150 ppm hardness). Swatches were then dried for forty-five minutes in separate laundry bags, stained with RDMO, and allowed to wick for at least sixteen hours. After the wicking period the swatches were subjected to a final wash under the same conditions used in the prewash.

To measure percent soil release, the average starting reflectance of the virgin cloth ($Rd_1$) was measured. The average reflectance of the RDMO stained cloth ($Rd_2$) was read after the sixteen hour wicking period. After the final wash and drying cycle, the average reflectance of the cleaned cloth ($Rd_3$) was determined. Percent soil release (% SR) was calculated using the following equation:

$$\% SR = \frac{(Rd_3 - Rd_2) \times 100}{(Rd_1 - Rd_2)}$$

Confidence intervals (95% level) were calculated for each formula evaluated.

Percent soil release at 95° F. for the copolymer structures of TABLE 1 (used at 2% active) are shown below in TABLE 5. In these experiments the alkoxylated alcohol, PLURAFAC®B-25-5 surfactant, was used at 7% (see TABLE 4). Additionally, the polyester swatches used were DACRON® double knit (DDK) under the same wicking and washing conditions of EXAMPLE 1.

TABLE 5

RED DYED MOTOR OIL SOIL RELEASE:
MIXED ACTIVE HDL (TABLE 4) PRE/FINAL
WASH 95° F. (12 min.); 80° F. (2 min.) 150 PPM

| POLYMER | DACRON ® DOUBLE KNIT | D(50)/C(50) BLEND |
|---|---|---|
| A | 79.6 (1.3) | 43.5 (1.8) |
| B | 83.6 (1.1) | 44.6 (1.6) |
| C | 83.8 (1.1) | 45.8 (2.0) |
| D | 80.9 (1.0) | 45.4 (1.7) |
| NONE | 22.3 (2.0) | 21.5 (0.9) |

95% confidence intervals are in parenthesis.

All of these polymer structures impart RDMO soil shield properties to DDK and 50/50 fabrics under warm water washing conditions. Improvements of 60% are observed on DDK and 20–24% on 50/50 blend.

Because of the outstanding performance of these polymers in warm water it was sought to investigate their soil shield properties under cold water (80° F.) washing conditions. In these studies we focused on the performance of the HBVE/HBVE(3EO) polymer (Polymer "C"), and the HBVE/HHVE(7EO) polymer (Polymer "D") and evaluated their performance in the mixed active liquid detergent formula (TABLE 4) based on either PLURAFAC® B-25-5 surfactant (7%) or NEODOL® 25-7 surfactant (7%). DACRON® single knit polyester (DSK) was used in this assessment. Results are shown in TABLE 6 below.

TABLE 6

RDMO SOIL RELEASE: MIXED ACTIVE HDL
(TABLE 4) PRE/FINAL WASH 80° F. (12 min.);
RINSE 80° F. (2 min.) 150 ppm

| POLYMER | DACRON ® SINGLE KNIT | D(50)/C(50) BLEND |
|---|---|---|
| 2% C/7% B-25-5 | 87.7 (1.2) | 35.4 (2.3) |
| 2% C/7% 25-7 | 86.1 (0.9) | 32.1 (0.6) |
| 2% D/7% B-25-5 | 70.6 (5.1) | 35.9 (2.2) |
| 2% D/7% 25-7 | 59.7 (7.8) | 30.2 (1.4) |
| 7% B-25-5 | 23.4 (2.8) | 20.5 (0.9) |
| 7% 25-7 | 27.4 (1.7) | 20.8 (2.7) |

Both polymer structures impart cold water RDMO soil shield properties to DSK and 50/50 blend fabrics. Polymer (HBVE/HBVE(3EO)) is preferred to Polymer (HBVE/HHVE(7EO)). In addition, formulations based on PLURAFAC® B-25-5 surfactant have small, but significant performance advantages over those based on NEODOL® 25-7 with both polymer structures.

While the invention has been described in each of its various embodiments, it is to be understood that modifications thereto may occur to those skilled in the art without departing from its true spirit and scope as set forth in the accompanying claims.

What is claimed is:

1. A method for the pretreatment of fabrics and textiles to impart soil release properties thereto, which comprises the step of contacting said fabrics with one or more copolymers comprising:

(a) from about 90 to about 10% by weight of vinyl ethers, (b) from about 10 to about 90% by weight of adducts of $C_2$–$C_4$ alkylene oxides with one or more compounds selected from the group consisting of vinyl ethers and polytetrahydrofuran vinyl ethers;

(c) from about 0 to about 80% by weight of monomers selected from the group consisting of divinyl ethers, compounds having about 2 or more —OH groups, and mixtures thereof.

2. The method according to claim 1, wherein (a) is selected from the group consisting of hydroxybutylvinyl ethers; hydroxyhexylvinyl ethers; ethyleneglycolmonovinyl ether; diethyleneglycolmonovinylether; triethyleneglycolmonovinylether; tetraethyleneglycolmonovinylether; polyethyleneglycolmonovinylether having a molecular weight up to about 10,000; 1,4-butanediolmonovinylether; 1,6-hexanediolmonovinylether; 1,2-propyleneglycolmonovinylether; dipropyleneglycolmonovinylether; tripropyleneglycolmonovinylether, polypropyleneglycolmonovinylether having a molecular weight up to about 10,000; 1,2-butyleneglycolmonovinylether; trans and cis cyclohexan-1,4-dimethanolmonovinylether; and mixtures thereof.

3. The method according to claim 1, wherein (b) is selected from the adducts of $C_2$–$C_4$ alkylene oxides with hydroxyalkylvinyl ethers.

4. The method according to claim 1, wherein (c) is selected from dimethylmaleate or diethylmaleate.

5. The method according to claim 2, wherein (a) is selected from hydroxybutylvinyl ethers or hydroxyhexylvinyl ethers and mixtures thereof.

6. The method according to claim 3, wherein said $C_2$–$C_4$ alkylene oxide is selected from ethylene oxide; propylene oxide; 1,2-butylene oxide; 2,3-butylene oxide; and isobutylene oxide.

7. The method according to claim 3, wherein (b) is selected from the adduct of ethylene oxide with hydroxyhexyl vinyl ether or the adduct of ethylene oxide with hydroxybutyl vinyl ether.

8. The method according to claim 3, wherein said $C_2$–$C_4$ alkylene oxide is in a molar ratio of 1 to 30 with said hydroxyalkylvinyl ether.

9. The method according to claim 8, wherein said molar ratio is 1 to 25.

10. The method according to claim 8 wherein said molar ratio is 3 to 10.

11. The method according to claim 1, wherein the ratio of (a) to (b) is 9:1 to 7:3.

12. The method according to claim 6, wherein said $C_2$–$C_4$ alkylene oxide is ethylene oxide.

13. The method according to claim 1, wherein (a) is hydroxybutylvinyl ether; (b) is the adduct of ethylene oxide with hydroxyethylvinyl ether; wherein further, the ratio of ethylene oxide to hydroxyhexylvinyl ether in (b) is 3 to 1.

14. The method according to claim 1, wherein (a) is hydroxybutylvinyl ether; (b) is the adduct of ethylene oxide with hydroxyhexylvinyl ether; wherein further, the ratio of ethylene oxide to hydroxyhexylvinyl ether in (b) is 25 to 1.

15. The method according to claim 1, wherein (a) is hydroxybutylvinyl ether; (b) is the adduct of ethylene oxide with hydroxybutylvinyl ether; wherein further, the ratio of ethylene oxide to hydroxybutylvinyl ether in (b) is 3 to 1.

16. The method according to claim 1, wherein (a) is hydroxybutylvinyl ether; (b) is the adduct of ethylene oxide with hydroxyhexylvinyl ether; wherein further, the ratio of ethylene oxide to hydroxyhexyl vinyl ether in (b) is 7 to 1.

17. The method according to claim 13, comprising 90% by weight of (a).

18. The method according to claim 13, comprising 70% by weight of (a).

19. The method according to claim 14, comprising 90% by weight of (a).

20. The method according to claim 14, comprising 70% by weight of (a).

21. The method according to claim 15, comprising 90% by weight of (a).

22. The method according to claim 15, comprising 70% by weight of (a).

23. The method according to claim 16, comprising 90% by weight of (a).

24. The method according to claim 16, comprising 70% by weight of (a).

* * * * *